United States Patent
Liu

(10) Patent No.: US 8,922,270 B2
(45) Date of Patent: Dec. 30, 2014

(54) CHARGE PUMP AND DRIVER INTEGRATED CIRCUIT USING THE SAME

(75) Inventor: Shang-I Liu, Kaohsiung (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 13/207,938

(22) Filed: Aug. 11, 2011

(65) Prior Publication Data

US 2012/0169406 A1    Jul. 5, 2012

(30) Foreign Application Priority Data

Jan. 4, 2011   (TW) .............................. 100100236 A

(51) Int. Cl.
     *G05F 1/10*      (2006.01)
     *H02M 3/07*      (2006.01)

(52) U.S. Cl.
     CPC ...................................... *H02M 3/07* (2013.01)
     USPC ............................................................. 327/536

(58) Field of Classification Search
     USPC ..................... 327/530, 534–537; 363/59, 60
     See application file for complete search history.

(56) References Cited

U.S. PATENT DOCUMENTS

| | | | |
|---|---|---|---|
| 7,511,977 B2* | 3/2009 | Oyama et al. | 363/62 |
| 7,737,765 B2* | 6/2010 | Tran et al. | 327/536 |
| 8,258,857 B2* | 9/2012 | Adkins et al. | 327/536 |
| 2010/0085786 A1 | 4/2010 | Chiu et al. | |
| 2010/0134177 A1* | 6/2010 | Hsu et al. | 327/536 |

FOREIGN PATENT DOCUMENTS

| | | |
|---|---|---|
| CN | 101051787 A | 10/2007 |
| CN | 101471601 A | 7/2009 |
| TW | 529230 B | 4/2003 |

OTHER PUBLICATIONS

Chinese Office Action dated on Oct. 27, 2014.

* cited by examiner

*Primary Examiner* — Sibin Chen
(74) *Attorney, Agent, or Firm* — Rabin & Berdo, P.C.

(57) ABSTRACT

A charge pump including an output terminal, an external capacitor, and a switch module is provided. The output terminal is coupled to an internal capacitor disposed inside an integrated circuit (IC). The external capacitor is disposed outside the IC. The switch module, coupled to the external capacitor and the internal capacitor configured to control the external capacitor and the internal capacitor to charge and discharge by turns. In a first operating period, the switch module controls the external capacitor to charge without providing current to the output terminal, and controls the internal capacitor to discharge to the output terminal.

16 Claims, 3 Drawing Sheets

20a

CHARGE PUMP AND DRIVER INTEGRATED CIRCUIT USING THE SAME

This application claims the benefit of Taiwan application Serial No. 100100236, filed Jan. 4, 2011, the subject matter of which is incorporated herein by reference.

BACKGROUND OF THE INVENTION

1. Field of the Invention

The invention relates in general to a charge pump, and more particularly to a charge pump capable of reducing the number of external capacitors and an electronic device using the same.

2. Description of the Related Art

With rapid advance in technology, charge pumps have been provided and widely used in various applications. For example, a charge pump can be used as a power circuit of an integrated circuit (IC). In general, the charge pump includes multiple switches, and two external capacitors (such as flying capacitors) disposed outside the IC. The multiple switches are switched in order. In a first operating period, a first external capacitor is discharged to stabilize the output voltage, and a second external capacitor is charged to generate a cross-voltage. In a second operating period, the voltage level at one terminal of the second external capacitor is boosted or stepped down, and the other terminal of the second external capacitor is discharged to the first external capacitor, so that the first external capacitor is charged, resulting in a boosted or reduced output voltage at the other terminal of the second external capacitor.

However, the existing charge pump normally requires an external capacitor with higher capacitance (such as tens of microfarads (uf)), and is thus disadvantaged by having circuit area and higher manufacturing cost. Therefore, how to provide a charge pump with smaller circuit area and lower manufacturing cost has become an imminent task for the industries.

SUMMARY OF THE INVENTION

The invention is directed to a charge pump and an electronic device using the same. Compared to the conventional charge pump, the charge pump has advantages of smaller circuit area and lower manufacturing cost. In addition, the electronic device can be operated in different loading current modes, hence having advantages of stable voltage and power saving.

According to a first aspect of the present invention, a charge pump including an output terminal, an external capacitor, and a switch module is provided. The output terminal is coupled to an internal capacitor disposed inside an integrated circuit (IC). The external capacitor is disposed outside the IC. The switch module, coupled to the external capacitor and the internal capacitor configured to control the external capacitor and the internal capacitor to charge and discharge by turns. In a first operating period, the switch module controls the external capacitor to charge without providing current to the output terminal, and controls the internal capacitor to discharge to the output terminal. In a second operating period, the switch module further controls the external capacitor to discharge to the internal capacitor and the output terminal so as to charge the internal capacitor. In the first operating period and the second operating period, a first loading current and a second loading current respectively flow the output terminal, wherein the first loading current is smaller than the second loading current.

According to a second aspect of the present invention, an electronic device including the aforementioned charge pump and a loading circuit is provided. The loading circuit is coupled to the charge pump to receive the current provided by the charge pump, and is operated in a first loading current mode and a second loading current mode in a first operating period and the second operating period respectively.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1:
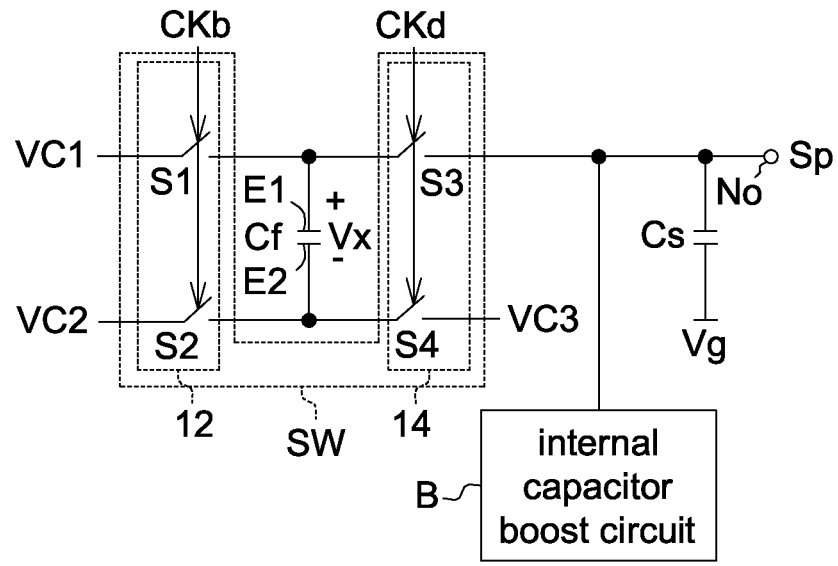
FIG. 1 shows a block diagram of a charge pump according to an embodiment.

Referring to FIG. 1, a block diagram of a charge pump according to an embodiment is shown. In the present embodiment, the charge pump 10*a* mainly includes an output terminal No, an external capacitor Cf and a switch module SW. The output terminal No is coupled to the internal capacitor Cs disposed inside an integrated circuit (IC). The internal capacitor Cs is exemplified by a single capacitor here, but is normally realized by one to multiple IC internal capacitors in actual application. These IC internal capacitors is located inside the IC, and can be implemented by exclusive capacitors dedicated for the charge pump 10*a*, parasitic capacitors of the internal elements of the IC, or a combination thereof. In contrast, the external capacitor Cf is disposed outside the IC and is preferably realized by a flying capacitor. In addition, the switch module SW includes multiple switches coupled to the external capacitor Cf and the internal capacitor Cs and is configured to control the charging and discharging of the external capacitor Cf and the internal capacitor Cs.

As the size of the internal capacitor Cs is smaller than that of the external capacitor Cf, the capacitance of the internal capacitor Cs is normally far smaller than the capacitance of the external capacitor Cf. For example, the numeric scale of the capacitance of the external capacitor Cf normally ranges from several microfarads (uF) to tens of microfarads, and the numeric scale of the capacitance of the internal capacitor Cs normally ranges from several picofarad (pF) to several nanofarads (nF).

By sequentially turning on/off multiple internal switches of the switch module SW, the charge pump 10*a* can perform charging operation and pumping operation by turns. Hereinafter, the periods in which the charge pump 10*a* performs charging operation and pumping operation are referred to as a first operating period Tb and a second operating period Td respectively. In the first operating period Tb, the switch module SW controls the external capacitor Cf to perform charging and controls the internal capacitor Cs to discharge to the output terminal No, so that the output terminal No outputs a first loading current. On the other hand, in the second operating period Td, the switch module SW controls the external capacitor Cf to discharge to the internal capacitor Cs and the output terminal No, so that the internal capacitor Cs performs charging and the output terminal No outputs a second loading current. As the capacitance of the internal capacitor Cs is normally smaller than the capacitance of the external capacitor Cf, the first loading current is normally smaller than the second loading current.

In other words, in the first operating period Tb, the first loading current is provided by the charges stored in the internal capacitor Cs; in the second operating period Td, the second loading current is provided by the charges stored in the external capacitor Cf. Consequently, the charge pump 10a can complete charging operation and pumping operation with an external capacitor Cf in conjunction with an internal capacitor Cs. In comparison to the generally known technology which implements charging operation and pumping operation with two large-sized external capacitors, the size of the charge pump 10a of the present embodiment can therefore be largely reduced.

Since the voltage level of the output signal Sp of the output terminal No is maintained in the first operating period by the charges stored in the internal capacitor Cs whose size is smaller Tb, it turns difficult to maintain the voltage level of the output signal Sp in some situations. Under such circumstances, an additional internal capacitor boost circuit B can be installed to help maintaining the level of the output signal Sp at the output terminal No. As indicated in FIG. 1, the internal capacitor boost circuit B is coupled to the output terminal No. In the first operating period Tb, or in both of the first operating period Tb and the second operating period Td, the internal capacitor boost circuit B can maintain the level of the output signal Sp.

Referring to FIG. 1 again, it also shows an embodiment of the detailed structure of the switch module SW. In the present embodiment, the switch module SW includes a first switch set 12 and a second switch set 14. The first switch set 12 is electrically connected to a plurality of input voltages (exemplified by the first and the second input voltages VC1 and VC2 here) and the first and second terminals E1 and E2 of the external capacitor Cf. The second switch set 14 is electrically connected to the first and second terminals E1 and E2 and the output terminal No of the external capacitor Cf.

The first switch set 12 is mainly used for controlling the coupling state between a plurality of input voltages (the first and the second input voltage VC1 and Vc2) and the external capacitor Cf so as to control the charging/discharging of the external capacitor Cf. To the contrary, the second switch set 14 is mainly used for controlling the coupling state between the external capacitor Cf and the internal capacitor Cs so as to control the charging/discharging of the internal capacitor Cs.

In the first operating period Tb, the first switch set 12 is turned on in response to the charge pulse signal CKb, so that the input voltages VC1 and VC2 are coupled to the external capacitor Cf to charge the external capacitor Cf, causing the external capacitor Cf to possess a charging cross-voltage Vx. In addition, the second switch set 14 is turned off in response to the pumping pulse signal CKd, so that the external capacitor Cf cannot be coupled to the internal capacitor Cs to charge the internal capacitor Cs, and the charges previously stored in the internal capacitor Cs are discharged to the output terminal No to generate a first loading current.

In the second operating period Td, the first switch set 12 is turned off in response to the charge pulse signal CKb, so that the external capacitor Cf not coupled to the input voltages is not charged. In addition, the second switch set 14 is turned on in response to the charge pulse signal CKb, so that the external capacitor Cf is coupled to the external capacitor Cs and the output terminal No, and the charges previously stored in the external capacitor Cf not only charge the internal capacitor Cs but are further transmitted to the output terminal No to generate a second loading current.

It is noted that the structure of the switch module SW is not limited to including the first switch set 12 and the second switch set 14, and any other structures of modules capable of controlling the internal capacitor Cs and the external capacitor Cf to charge/discharge can be used as the switch module SW.

FIG. 1 further shows the detailed structure of a specific example of the first switch set 12 and the second switch set 14. In the specific example, the first switch set 12 includes a first switch 51 and a second switch S2. One input terminal of the first switch 51 receives the first input voltage VC1 and the other input terminal is coupled to the first terminal E1 of the external capacitor Cf. One input terminal of the second switch S2 receives the second input voltage VC2 and the other input terminal is coupled to the second terminal E2 of the external capacitor Cf. The second switch set 14 includes a third switch S3 and a fourth switch S4. Two input terminals of the third switch S3 are respectively coupled to the output terminal No and the first terminal E1 of the external capacitor Cf. One input terminal of the fourth switch S4 receives the third input voltage VC3 and the other input terminal is coupled to the second terminal E2 of the external capacitor Cf.

The operation of the charge pump 10a in the specific example is elaborated below. Firstly, in the first operating period Tb, the first switch S1 and the second switch S2 are turned on in response to a high signal level of the charge pulse signal CKb, thus respectively providing the input voltages VC1 and VC2 to the first and the second terminals E1 and E2 of the external capacitor Cf, further controlling the external capacitor Cf to charge. As a result, there is a charging cross-voltage Vx between the first terminal E1 and the second terminal E of the external capacitor Cf, wherein the charging cross-voltage Vx satisfies: Vx=VC1−VC2. In addition, the third switch S3 and the fourth switch S4 are turned off in response to a low signal level of the pumping pulse signal CKd, so that the external capacitor Cf is not coupled to the internal capacitor Cs, and the charges previously stored in the internal capacitor Cs are discharged to the output terminal No to generate a first loading current.

In the second operating period, the first switch S1 and the second switch S2 are turned off in response to the low signal level of the charge pulse signal CKb, so that the external capacitor Cf no more performs charging. Meanwhile, the third switch S3 and the fourth switch S4 are turned on in response to the high signal level of the pumping pulse signal CKd. The fourth switch S4 when turned on can enable the third input voltage VC3 to be transmitted to the second terminal E2 of the external capacitor Cf. Therefore, at the beginning of the second operating period Td, the voltage level at the first terminal E1 of the external capacitor Cf is substantially equal to a sum of the third input voltage VC3 and the charging cross-voltage Vx. In other words, the voltage $V_{E1}$ at the first terminal E1 satisfies: $V_{E1}$=VC3+Vx. The third switch S3 when turned on can enable the first terminal E1 of the external capacitor Cf to be coupled to the internal capacitor Cs and the output terminal No, so that the voltage level of the output signal Sp is equal to $V_{E1}$=VC3+Vx. Apart from being used to charge the internal capacitor Cs, the charges previously stored in the external capacitor Cf during the first operating period Tb are further transmitted to the output terminal No to generate a second loading current.

It is noted that the first switch set 12 and the second switch set 14 are not limited to the two switches connected in the aforementioned manner, and any other structures of modules capable of controlling the internal capacitor Cs and the external capacitor Cf to charge/discharge can be used as the first switch set 12 and the second switch set 14.

By setting different relationship between the voltage levels of the first to the third input voltages VC1~VC3, the output signal Sp with different voltage levels can be generated to satisfy various applications. For example, in an operating example, the charge pump 10a is designed as a double voltage circuit. The first input voltage VC1 and the third input voltage VC3 are both set at a high reference level VDD, and the second input voltage VC2 is set at a low reference level VG (such as 0 like the grounding level), wherein the voltage $V_{E1}$ satisfies:

$$V_{E1}=VC3+Vx=VC3-VC2+VC1=VDD-VG+VDD=2VDD$$

Consequently, the voltage level of the output voltage Sp provided by the charge pump 10a is substantially double the high reference level VDD.

In another operating example, the charge pump 10a is designed as a negative double voltage circuit. The first input voltage VC1 and the third input voltage VC3 are both equal to a low reference level VG (such as 0 like the grounding level), and the second input voltage VC2 is set at a high reference level VDD, wherein voltage $V_{E1}$ satisfies:

$$V_{E1}=VC3+Vx=VC3-VC2+VC1=VG-VDD+VG=-VDD$$

Consequently, the voltage level of the output voltage Sp provided by the charge pump 10a is substantially negative double the high reference level VDD.

In different operating periods, the charge pump 10a can provide different magnitudes of loading currents for driving the loading. Thus, a loading circuit coupled to the charge pump for receiving the current provided by the charge pump can be designed to operate in a first loading current mode and a second loading current mode in the first operating period and the second operating period respectively.

Figure 2:
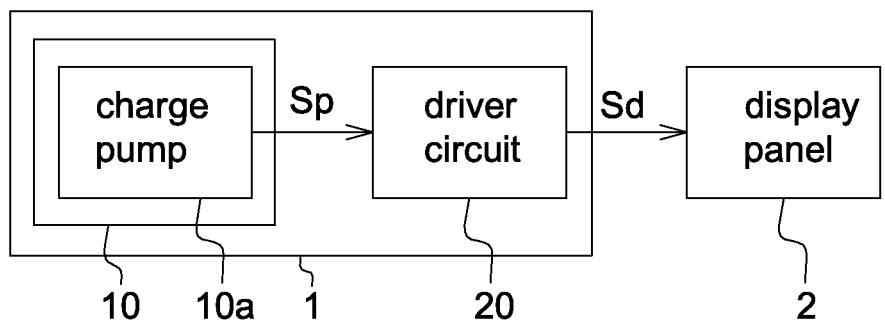
FIG. 2 shows a block diagram of an electronic device according to an embodiment.

FIG. 2 shows a block diagram of an electronic device using the charge pump of FIG. 1 according to an embodiment. In FIG. 2, the electronic device 100 includes a driver device 1 and a display panel 2. The driver device 1 includes a power circuit 10 and a driver circuit 20. The power circuit 10 includes the charge pump 10a of FIG. 1. The driver circuit 20 is used as a loading circuit of the power circuit 10 for receiving the current provided by the charge pump 10a to drive the display panel 2. In an operating example, the driver circuit 20 is a data driver which uses the output signal Sp provided by the power circuit 10 as a power signal and provides a data display voltage Sd to drive the display panel 2.

Figure 3:
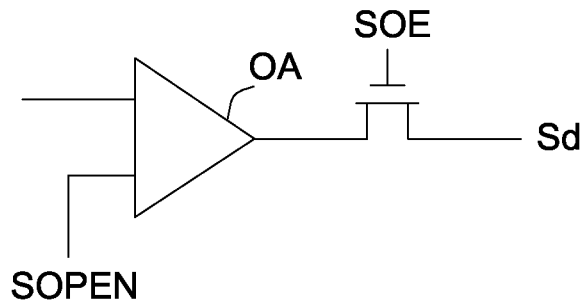
FIG. 3 shows a partial circuit diagram of the driver circuit of FIG. 2 according to an embodiment.

FIG. 3 shows a partial circuit diagram of the driver circuit of FIG. 2 according to an embodiment. As indicated in FIG. 3, the driver circuit 20 can has an output stage circuit 20a, which includes an output operation amplifier OA. In response to the high level of an output stage circuit enabling signal SOPEN and an output enabling signal SOE, the output operation amplifier OA provides a data display voltage Sd to drive the display panel 2, and in response to low levels of the output stage circuit enabling signal SOPEN and the output enabling signal SOE, the output operation amplifier OA terminates outputting the data display voltage Sd.

In an operating period Th with high power consumption, the output stage circuit enabling signal SOP EN is at a high signal level, and the driver circuit 20 needs to provide a data display voltage Sd to drive the display panel 2. In an operating period Tl with low power consumption, the output stage circuit enabling signal SOP EN is at the low signal level, and the driver circuit 20 does not need to provide a data display voltage Sd to drive the display panel 2.

Figure 4:
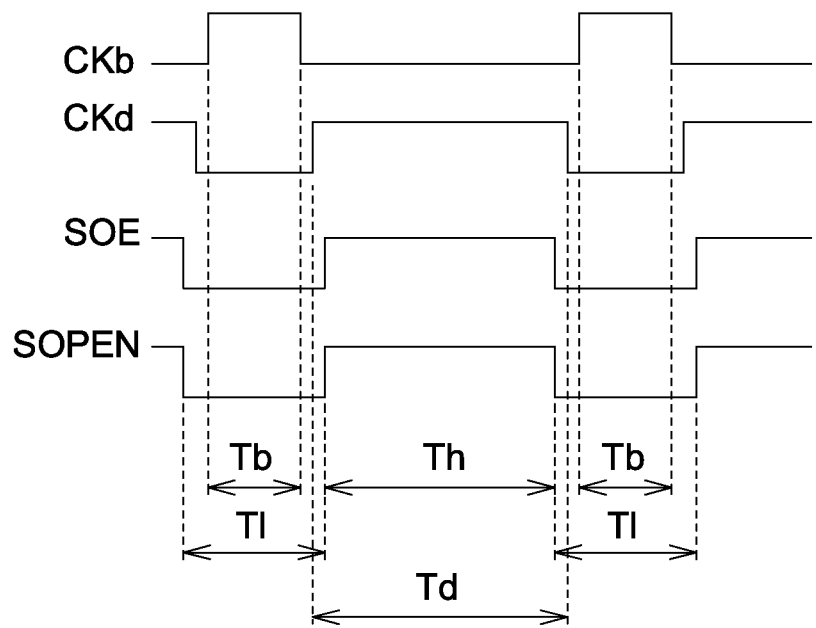
FIG. 4 shows a timing diagram of related signals of the driver circuit of FIG. 3 according to an embodiment.

FIG. 4 shows a timing diagram of related signals of the driver circuit of FIG. 3 according to an embodiment. Preferably, the operating period Th with high power consumption can fall within the second operating period Td of the charge pump 10a, so that the driver circuit 20 is operated in the second loading current mode. Thus, it can be assured that the power circuit 10 has sufficient ability for driving the current in the operating period Th with high power consumption, so that the output signal Sp and the driver circuit 20 can avoid abnormal operations and level shifting of the data display voltage Sd. In addition, the operating period Tl with low power consumption can fall within the first operating period Tb of the charge pump 10a, so that the driver circuit 20 is operated in the first loading current mode so as to save power consumption.

In the above embodiments, the power circuit 10 includes a charge pump 10a. However, in other embodiments, two or more charge pumps can be cascaded to provide different types of output signals.

Figure 5:
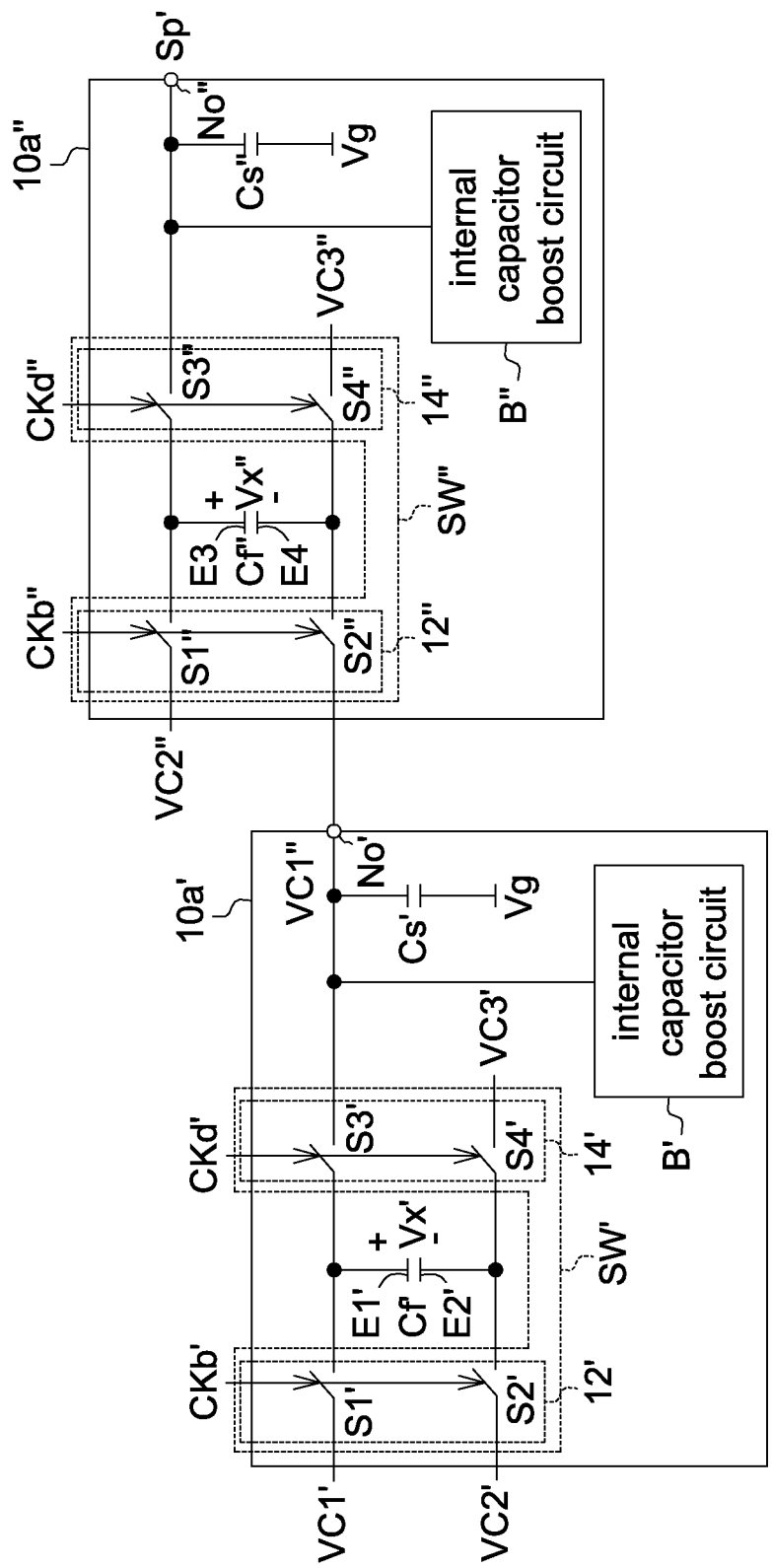
FIG. 5 shows a circuit block diagram of a charge pump device according to an embodiment.

Referring to FIG. 5, a circuit block diagram of a charge pump device according to an embodiment is shown. The charge pump device can also be used in the power circuit 10 of FIG. 2. In the present embodiment, the charge pumps 10a' and 10a" are cascaded, that is, the output signal generated by the charge pump 10a' is used as an input voltage VC1" inputted to the charge pump 10a". The circuit structures of the charge pumps 10a' and 10a" are substantially similar to that of the charge pump 10a of FIG. 1. Thus, by controlling the voltage level of the charge pumps 10a' and 10a", an output signal Sp' can be obtained at the output terminal No" of the charge pump 10a", and the voltage level of the output signal Sp' can be expressed as:

$$\begin{aligned} V_{E3} &= VC3'' + Vx'' \\ &= VC3'' + (VC2'' - VC1'') \\ &= VC3'' + VC2'' - (VC3' + Vx') \\ &= VC3'' + VC2'' - VC3' - (VC1' - VC2') \end{aligned}$$

In an operating example, both the input voltage VC3' and the input voltage VC1' correspond to a high reference level VDD, and the input voltages VC2', VC2" and input voltage VC3" correspond to a low reference level VG (such as the grounding level), wherein the voltage VC1" and $V_{E3}$ can satisfy the following expressions:

$$VC1''=VC3'+Vx'=VDD+(VDD-VG)=2VDD$$

$$V_{E3}=VC3''+VC2''-VC3'-(VC1'-VC2')=-VDD-(VDD)=-2VDD$$

Consequently, the voltage level of the output signal provided by the charge pump 10a' is substantially equal to double the high reference level VDD, and the voltage level of the output signal Sp' provided by the charge pump 10a" is substantially equal to negative double the high reference level VDD.

It is noted that in the above embodiments, the operations of the charge pump 10a are based on the exemplification that the charge pump 10a is operated in two different periods. In addition, in part of the above embodiments, the elaborations of the detailed structure of the switch module are based on the exemplification that each of the two switch sets respectively includes two switches. However, the invention is not limited to such exemplifications, and in other embodiments, different types of operations and different structures of the switch module can be implemented. Any designs are within the scope of protection of the invention as long as the complete operation of the charge pump is done by a single external capacitor Cf, or, in a charging period, the loading current is provided by only the charges stored in the internal capacitor without using charges stored in any external capacitor (one or more external capacitor can be disposed).

In the above embodiments, the charge pump can be implemented by an IC external capacitor and one or multiple IC internal capacitors (here collectively referred as an internal capacitor). Compared to a conventional charge pump, the charge pump and the driver device of the above embodiments have advantages of smaller circuit area and lower manufacturing cost. In addition, the charge pump of the above embodiments can be used for enabling the electronic devices to operate in different loading current modes, hence having advantages of stable voltage and power saving.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A charge pump for an integrated circuit (IC), the IC including an internal capacitor that has first and second terminals, the first terminal being biased to a first fixed reference voltage level, comprising:
   an output terminal configured to be coupled to the second terminal of the internal capacitor of the IC;
   an external capacitor, configured to be disposed outside the IC; and
   a switch module coupled to the external capacitor and configured to be coupled to the internal capacitor, and configured to control the external capacitor and the internal capacitor to charge and discharge in turn, the switch module comprising:
      a first switch set configured to be coupled between a plurality of input voltages including first and second input voltages and the external capacitor, the first switch set comprising:
         a first switch configured to be coupled between the first input voltage and the external capacitor; and
         a second switch configured to be coupled between the second input voltage and the external capacitor; and
      a second switch set configured to be coupled between the internal capacitor and the external capacitor; the second switch set comprising:
         a third switch coupled between the output terminal and the external capacitor; and
         a fourth switch configured to be coupled between a third input voltage, set at a second fixed reference voltage level different from the first fixed reference voltage level, and the external capacitor;
   wherein the switch module is configured to control the external capacitor in a first operating period to charge without providing current to the output terminal, and to control the internal capacitor in said first operating period to discharge to the output terminal.

2. The charge pump according to claim 1, wherein the switch module is further configured to control the external capacitor in a second operating period to discharge to the internal capacitor and the output terminal so as to charge the internal capacitor.

3. The charge pump according to claim 2, wherein in the first operating period and the second operating period, the output terminal respectively circulates a first loading current and a second loading current, and the first loading current is smaller than the second loading current.

4. An electronic device, comprising:
   the charge pump according to claim 2; and
   a loading circuit coupled to the charge pump to receive the current provided by the charge pump, and operating in a first loading current mode and a second loading current mode in the first operating period and the second operating period respectively.

5. An electronic device, comprising:
   the charge pump according to claim 3; and
   a loading circuit coupled to the charge pump to receive the current provided by the charge pump, and operating in a first loading current mode and a second loading current mode in the first operating period and the second operating period respectively.

6. The charge pump according to claim 1, wherein in the first operating period, the first switch set is turned on and the second switch set is turned off.

7. The charge pump according to claim 1, wherein in a second operating period, the first switch set is turned off and the second switch set is turned on.

8. The charge pump according to claim 1, wherein in the first operating period, the external capacitor is charged and has a charging cross-voltage, the charging cross-voltage is substantially equal to the voltage difference between the first input voltage and the second input voltage.

9. The charge pump according to claim 1, wherein when the second operating period starts, the voltage level at one terminal of the external capacitor is substantially equal to a sum of the third input voltage and the voltage level of a charging cross-voltage at the external capacitor.

10. The charge pump according to claim 1, further comprising:
    an internal capacitor boost circuit configured to be coupled to the output terminal for maintaining the voltage level at the output terminal at least in the first operating period.

11. A charge pump for an integrated circuit (IC), the IC including an internal capacitor that has first and second terminals, the first terminal being biased to a first fixed reference voltage level, comprising:
    an output terminal configured to be coupled to the second terminal of the internal capacitor of the IC;
    an external capacitor, configured to be disposed outside the IC; and
    a switch module coupled to the external capacitor and configured to be coupled to the internal capacitor;
    wherein the switch module comprises:
       a first switch set configured to be coupled between first and second input voltages set at fixed voltage levels and the external capacitor; and
       a second switch set configured to be coupled between the internal capacitor and a third input voltage set at a second fixed reference voltage level different from the first fixed reference voltage level.

12. The charge pump according to claim 11, wherein the first switch set comprises:
    a first switch configured to be coupled between the first input voltage and the external capacitor; and
    a second switch configured to be coupled between the second input voltage and the external capacitor.

13. The charge pump according to claim 12, wherein the second switch set comprises:
   a third switch coupled between the output terminal and the external capacitor; and
   a fourth switch configured to be coupled between the third input voltage and the external capacitor.

14. The charge pump according to claim 11, further comprising:
   an internal capacitor boost circuit coupled to the output terminal for maintaining the voltage level at the output terminal at least in the first operating period.

15. The charge pump according to claim 11, wherein the switch module is configured to control the external capacitor in a first operating period to charge without providing current to the output terminal, and to control the internal capacitor in said first operating period to discharge to the output terminal, and wherein the switch module is further configured to control the external capacitor in a second operating period directly connected to an ending point of the first operating period, to discharge to the internal capacitor and the output terminal so as to charge the internal capacitor.

16. The charge pump according to claim 15, wherein the switch module is configured to control the external capacitor in a third operating period directly connected to an ending point of the second operating period to charge without providing current to the output terminal, and to control controls the internal capacitor in said third operating period to discharge to the output terminal.

* * * * *